(12) United States Patent  (10) Patent No.: US 7,991,793 B2
Normington et al.  (45) Date of Patent: Aug. 2, 2011

(54) SYSTEM AND METHOD FOR UTILIZING GENERATIONAL FILE NAMES FOR DIAGNOSTIC DATA FILES

(75) Inventors: Glyn Normington, Winchester (GB); Ian O. Partridge, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 12/037,165

(22) Filed: Feb. 26, 2008

(65) Prior Publication Data

US 2009/0216817 A1 Aug. 27, 2009

(51) Int. Cl.
*G06F 7/00* (2006.01)
*G06F 17/30* (2006.01)

(52) U.S. Cl. ........ 707/792; 707/793; 707/794; 707/796; 707/803; 707/804

(58) Field of Classification Search .................. 707/792, 707/793, 796, 803, 804
See application file for complete search history.

(56) References Cited

U.S. PATENT DOCUMENTS

| | | | | |
|---|---|---|---|---|
| 4,922,485 A | * | 5/1990 | Quinquis et al. | 370/418 |
| 5,764,972 A | * | 6/1998 | Crouse et al. | 1/1 |
| 6,256,643 B1 | * | 7/2001 | Cork et al. | 1/1 |
| 6,438,320 B1 | * | 8/2002 | Hatanaka | 386/117 |
| 7,263,576 B2 | * | 8/2007 | Todd | 711/108 |
| 7,386,576 B2 | * | 6/2008 | Watanabe et al. | 1/1 |
| 2002/0049726 A1 | * | 4/2002 | Cork et al. | 707/1 |
| 2004/0176981 A1 | * | 9/2004 | Martello et al. | 705/2 |
| 2004/0252198 A1 | * | 12/2004 | Hatanaka | 348/207.1 |
| 2005/0091287 A1 | * | 4/2005 | Sedlar | 707/200 |
| 2006/0066982 A1 | * | 3/2006 | Flechsig et al. | 360/75 |
| 2006/0271731 A1 | * | 11/2006 | Kilian et al. | 711/108 |
| 2007/0038689 A1 | * | 2/2007 | Shinkai | 707/205 |

* cited by examiner

*Primary Examiner* — John Breene
*Assistant Examiner* — Mark E Hershley
(74) *Attorney, Agent, or Firm* — Schmeiser, Olsen & Watts; Robert E. Straight

(57) ABSTRACT

A system and associated method for utilizing file names for diagnostic data files generated by a runtime environment. The method employs a file counter base that defines a predefined maximum number of files permitted in a file system, a generation number that indicates an instance of the runtime environment, and a file counter that comprises a file name. The file counter circulates by a cycle equal to the file counter base such that the file system uses only a limited disk space. The method determines the generation number per instance of the runtime environment by examining file counters of existing files in the file system. The generation number initializes the file counter for creating file names in the instance of the runtime environment. The method guarantees a longest life span of a diagnostic data file in a file system that has a limited number of files.

14 Claims, 4 Drawing Sheets

GENERATIONAL FILE NAME SYSTEM
100

SYSTEM AND METHOD FOR UTILIZING GENERATIONAL FILE NAMES FOR DIAGNOSTIC DATA FILES

FIELD OF THE INVENTION

The present invention discloses a system and associated method for naming and storing system data files in a way that maximizes disk space utilization and life spans of system data files.

BACKGROUND OF THE INVENTION

Runtime environments and their equivalents in virtual machines generate system data files for diagnostic purposes. There is a need to name and to store aforementioned system data files in a way that a file system of a runtime environment preserves system data files long enough to be analyzed by a system administrator while consuming a limited amount of disk spaces for such system data files.

A conventional naming scheme that uses a cyclic counter in a file name of system data files unnecessarily overwrites system data files generated by a previous run of a runtime environment. Another conventional naming scheme that uses a process identifier or a time stamp in a file name of system data files prevents premature overwriting but consumes very large amount of disk spaces.

Thus, there is a need for a system and associated method that overcomes at least one of the preceding disadvantages of current methods and systems for naming and storing system data files.

SUMMARY OF THE INVENTION

The present invention provides a method for utilizing file names, the method comprising:

initializing a generation number (Z) such that a number of files in a file system does not exceed a predetermined maximum number of files permitted in the file system and such that each file in the file system stays for a longest life span before being overwritten, wherein said initializing is performed at startup of a runtime environment that manipulates the file system, wherein a file counter base (X) defines the predetermined maximum number of files permitted in the file system, wherein each file in the file system is uniquely identified by a respective file name (N) that comprises a respective file counter (F);

subsequent to said initializing, setting a file counter (F) to the generation number (Z);

subsequent to said setting, storing a file in the file system by a file name (N) comprising the file counter (F); and subsequent to said storing, recalculating a new value of the file counter (F) from a current value of the file counter (F).

The present invention provides a computer program product, comprising a computer usable storage medium having a computer readable program code embodied therein, said computer readable program code containing instructions that when executed by a processor of a computer system implement a method for utilizing file names, the method comprising:

initializing a generation number (Z) such that a number of files in a file system does not exceed a predetermined maximum number of files permitted in the file system and such that each file in the file system stays for a longest life span before being overwritten, wherein said initializing is performed at startup of a runtime environment that manipulates the file system, wherein a file counter base (X) defines the predetermined maximum number of files permitted in the file system, wherein each file in the file system is uniquely identified by a respective file name (N) that comprises a respective file counter (F);

subsequent to said initializing, setting a file counter (F) to the generation number (Z);

subsequent to said setting, storing a file in the file system by a file name (N) comprising the file counter (F); and subsequent to said storing, recalculating a new value of the file counter (F) from a current value of the file counter (F).

The present invention provides a computer system comprising a processor and a computer readable memory unit coupled to the processor, said memory unit containing instructions that when executed by the processor implement a method for utilizing file names, the method comprising:

initializing a generation number (Z) such that a number of files in a file system does not exceed a predetermined maximum number of files permitted in the file system and such that each file in the file system stays for a longest life span before being overwritten, wherein said initializing is performed at startup of a runtime environment that manipulates the file system, wherein a file counter base (X) defines the predetermined maximum number of files permitted in the file system, wherein each file in the file system is uniquely identified by a respective file name (N) that comprises a respective file counter (F);

subsequent to said initializing, setting a file counter (F) to the generation number (Z);

subsequent to said setting, storing a file in the file system by a file name (N) comprising the file counter (F); and subsequent to said storing, recalculating a new value of the file counter (F) from a current value of the file counter (F).

The present invention provides a method and system that overcomes at least one of the current disadvantages of conventional method and system for utilizing file names for diagnostic data files.

DETAILED DESCRIPTION OF THE INVENTION

Figure 1:
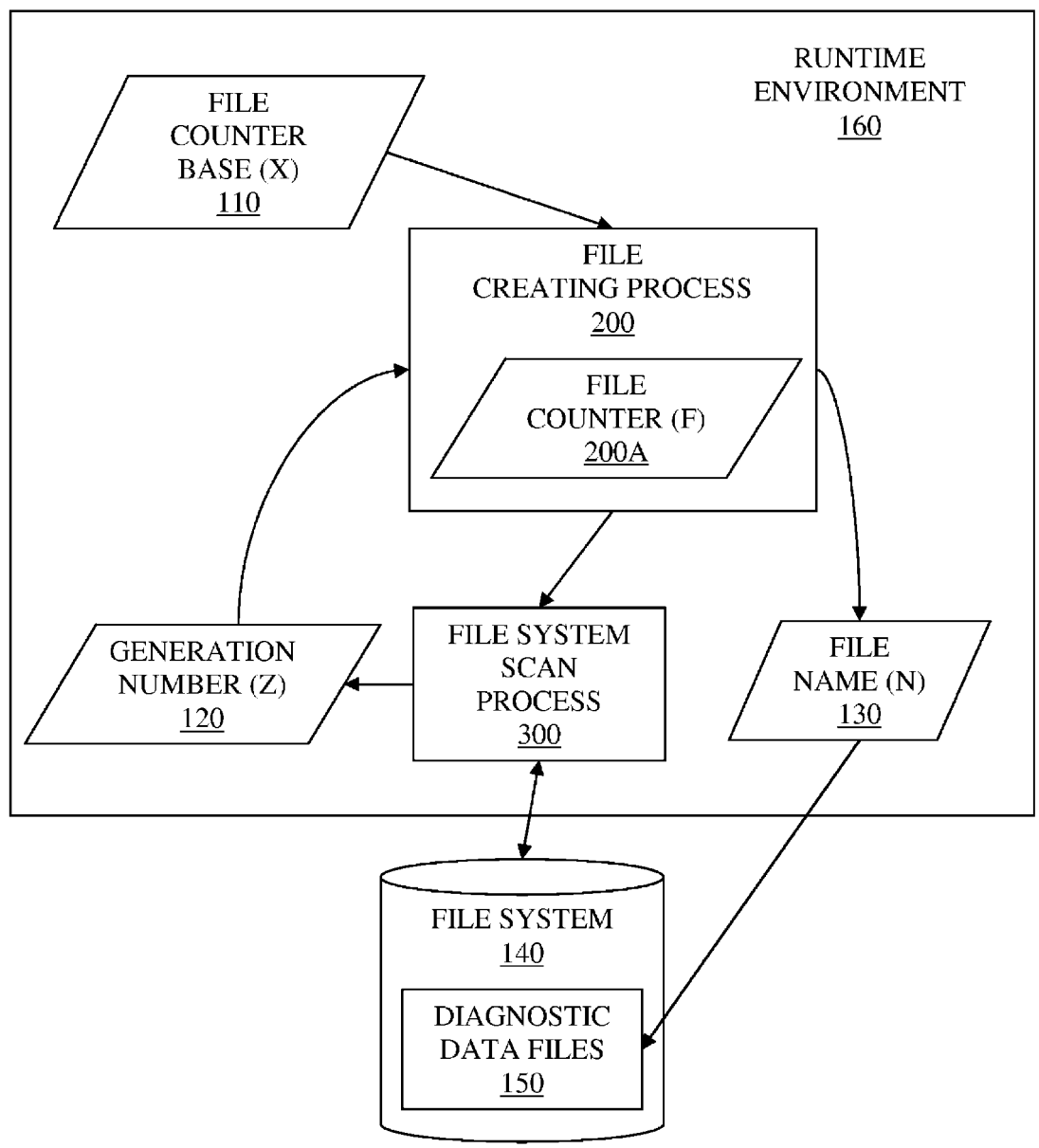
FIG. 1 illustrates a generational file name system for diagnostic data files, in accordance with embodiments of the present invention.

FIG. 1 illustrates a generational file name system 100 for diagnostic data files 150, in accordance with embodiments of the present invention. The generational file name system 100 operates on a runtime environment 160 which comprises a file creating process 200, and a file system scan process 300. A file system 140 comprises diagnostic data files 150 that are stored by the file creating process 200. Examples of the runtime environment 160 include, inter alia, a Java Virtual Machine (JVM®), etc. Examples of data stored in diagnostic data files 150 include, inter alia, memory dumps, traces, heap statistics, a process identifier of a process that creates the data, a timestamp when the data is created, etc. After the runtime environment 160 starts running, the file creating process 200 takes a file counter base (X) 110 and invokes the file system scan process 300 that determines a generation number (Z) 120 once per instance of the runtime environment 160 at startup. The file creating process produces a file name (N) 130 for a diagnostic data file 150 that comprises a file counter (F) 200A. The file counter (F) 200A is initialized to the generation number (Z) 120.

The file creating process 200 recalculates the file counter (F) 200A for a next diagnostic data file as a function of the file counter base (X) 110 and an incremented file counter (F+1). A new diagnostic data file 150 is stored in the file system 140 with a new file name (N) 130 that comprises a new value of the file counter (F) that circulates according to the file counter base (X) 110.

One of conventional schemes for storing diagnostic data files in a JVM® uses a cyclic counter in a file name to limit a number of diagnostic data files in the file system, which does not count a restart of the JVM® in naming diagnostic files. Thus, a diagnostic data file that has been created by a previous run of the JVM® may be immediately overwritten by a restart of the JVM® without having any lifetime to be examined by a system administrator. This is especially problematic when such diagnostic data file is created to report an abnormal termination of the JVM®. After a restart, the JVM® has no recollection as to diagnostic data files created in a previous run. Consequently, the diagnostic data file on the abnormal termination may be overwritten immediately after a restart, which defeats the purpose of diagnostic data files that provides data for system failures to be overcome. The generational file name system 100 resolves such premature overwriting of diagnostic data files by recognizing an instance of the runtime environment 160 with the generation number (Z) 120.

Figure 2:
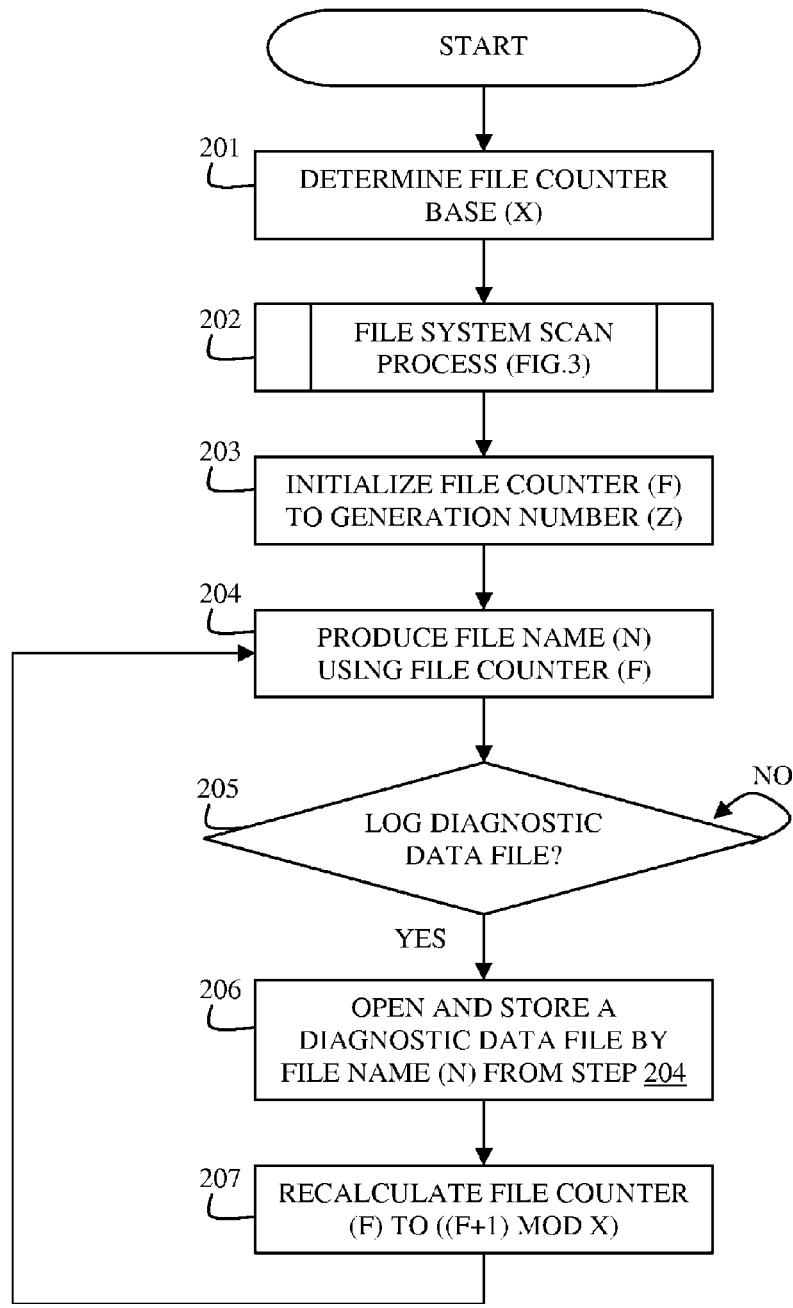
FIG. 2 is a flowchart depicting a method for the generational file name system of FIG. 1, in accordance with the embodiments of the present invention.

FIG. 2 is a flowchart depicting a method for the generational file name system of FIG. 1, supra, in accordance with the embodiments of the present invention.

In step 201, the file creating process determines a value of a file counter base (X). In one embodiment, the file creating process receives a parameter from a command line and parses the received parameter that specifies the value of the file counter base (X). In the same or another embodiment, the parameter further comprises a file name pattern (Y). In the embodiment, wildcard syntax such as "file % g5name.dmp" may be used for the file name pattern (Y), wherein "% g5" is replaced by a generation number and/or a file counter calculated in the file system scan process with the file counter base 5.

The file counter base (X) is a modulus that is a quantity by which two given quantities can be divided to yield the same remainders where two given quantities are positive integers and the difference between two given quantities is (X). The file counter base (X) determines a number of diagnostic data files that can coexist in the file system. In one embodiment, the generation number base (X) is 5 that is the number of files in one cycle before the file creating process produces a same name for a new diagnostic data file.

In step 202, the file creating process invokes a file system scan process and then receives the generation number (Z) that the file system scan process returns. See FIG. 3, infra, for details as to the determination of the generation number (Z).

In step 203, the file creating process initializes a file counter (F) to the generation number (Z) returned by the file system scan process in step 202.

In step 204, the file creating process produces a file name (N) with the file counter (F) to name a diagnostic file created by the current instance of the runtime environment. The file name (N) may further comprise, inter alia, a process identifier that creates a diagnostic data file, a timestamp when the diagnostic data file is created, etc. In other embodiment, step 204 can be a separate subprocess that produces a file name (N) by parameters comprising the generation number (Z) and the file counter (F).

In step 205, the file creating process determines whether there is a request to log a diagnostic file to the file system. If the file creating process determines that there is a request, then the file creating process proceeds with step 205. If the file creating process determines that there is no request, then the file creating process waits for a request in step 205.

In step 206, the file creating process opens and stores a diagnostic data file with the file name (N) produced in step 204.

In step 207, the file creating process recalculates the file counter (F) to ((F+1) mod X). Subsequent to step 207, the file creating process loops back to step 204 to re-perform steps 204, 205, 206, and 207. The loop is indefinite because a file name for a diagnostic data file should be available anytime during the runtime environment runs.

The recalculated value of the file counter (F) for a next loop is (F+1) if (F+1) is less than the file counter base (X), or zero (0) if (F+1) is equal to the file counter base (X). Thus, the recalculated value of the file counter (F) repeats itself in every (X) number of loops. Also, because the file creating process scans the file system for an existing value of the generation number (Z) in determining the generation number (Z) when the runtime environment starts running, the file counter (F) continues to increase from the existing value of the generation number (Z) until it drops to zero (0) for a new cycle, regardless of a number of restarts the runtime environment may take. Because the file counter (F) circulates, a diagnostic data file stored by the previous run of the runtime environment will stay in the file system for a time period that is long enough for a system administrator to analyze the diagnostic data. At the same time, the circulating file counter (F) makes a storage space used by diagnostic data files to be bounded and reused.

In one embodiment, to correlate an instance of the JVM® with diagnostic data files created by the instance, the JVM® displays logging information to the console and/or writes logging information to system log as the file creating process writes a diagnostic data file to a storage medium.

Figure 3:
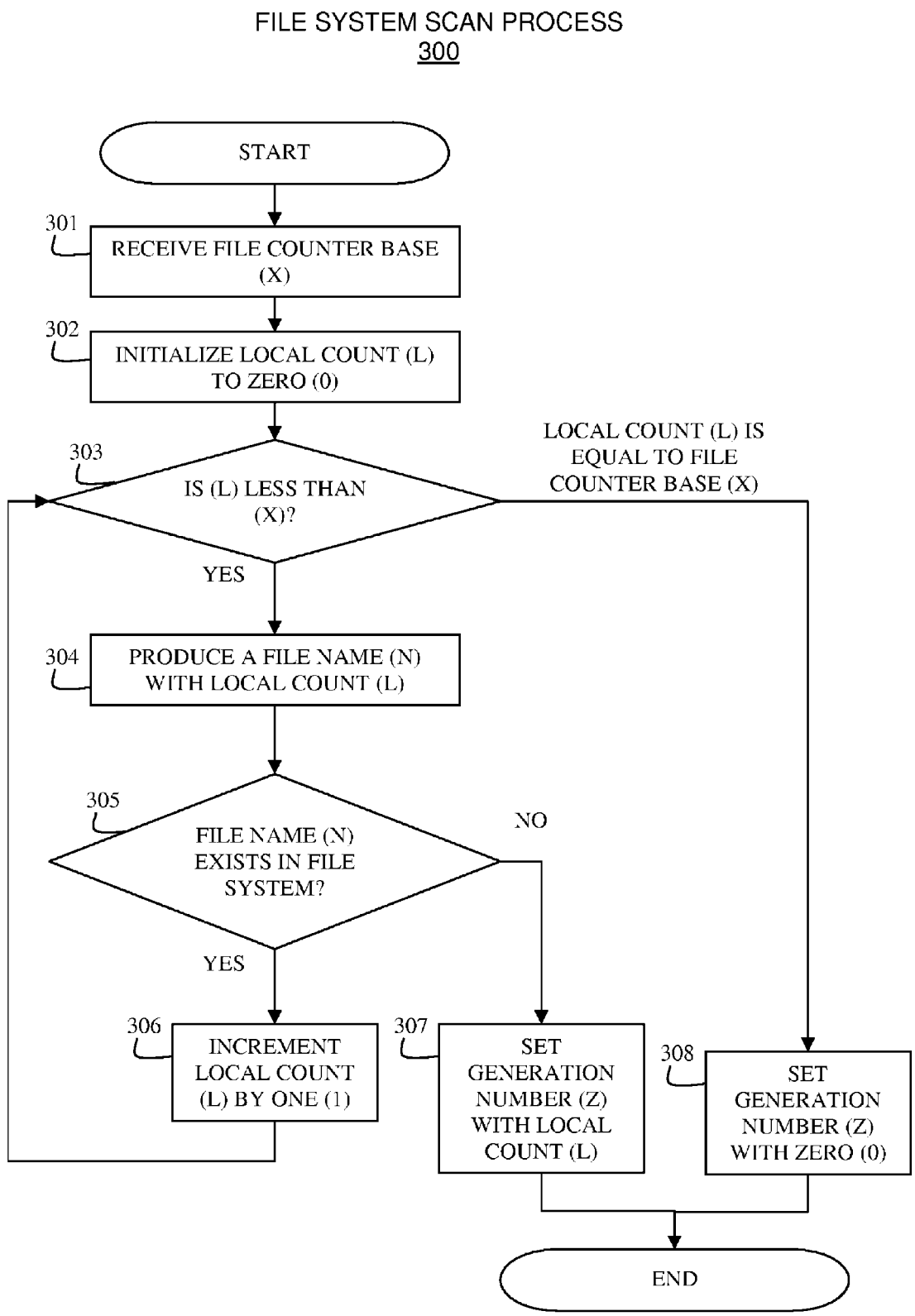
FIG. 3 is a flowchart depicting a method for the file system scan process of FIG. 1, in accordance with the embodiments of the present invention.

FIG. 3 is a flowchart depicting a method for the file system scan process of FIG. 1, supra, in accordance with the embodiments of the present invention.

In step 301, the file system scan process receives the file counter base (X) from the file creating process that invokes the file system scan process at the startup of the runtime environment to determine an initial value of the generation number (Z).

In step 302, the file system scan process initializes a local count (L) to zero (0), to scan the file system for all permitted values of the generation number (Z).

In step 303, the file system scan process determines whether the local count (L) is less than the file counter base (X). If the file system scan process determines that the local count (L) is less than the file counter base (X), the file system scan process proceeds with step 304. If the file system scan process determines that the local count (L) is equal to the file counter base (X), the file system scan process proceeds with step 308.

In step 304, the file system scan process produces a file name (N) with a current value of the local count (L). In other embodiment, step 304 can be a separate subprocess that receives input parameters comprising a generation number (Z) and that produces and returns a file name (N).

In step 305, the file system scan process determines whether the file name (N) generated in step 304 exists in a file system. If the file system scan process determines that the received file name (N) exists in the file system, the file system scan process proceeds with step 306. If the file system scan process determines that the received file name (N) does not exist in the file system, the file system scan process proceeds with step 307.

In step 306, the file system scan process increment the current value of the local count (L) by one (1), i.e., (L+1), and loops back to step 303 to re-perform steps 303, 304, and 305.

In step 307, the file system scan process determines that the current value of the local count (L) is an initial value for the generation number (Z) and returns the initial value for the generation number (Z) to the file creating process.

In step 308, the file system scan process returns zero (0) to the file creating process as an initial value for the generation number (Z) and terminates. As shown in steps 307 and 308, the file system scan process returns the initial value in the range of zero (0) to (X−1) targeted to be used as a generation number (Z) in the file creating process.

Figure 4:
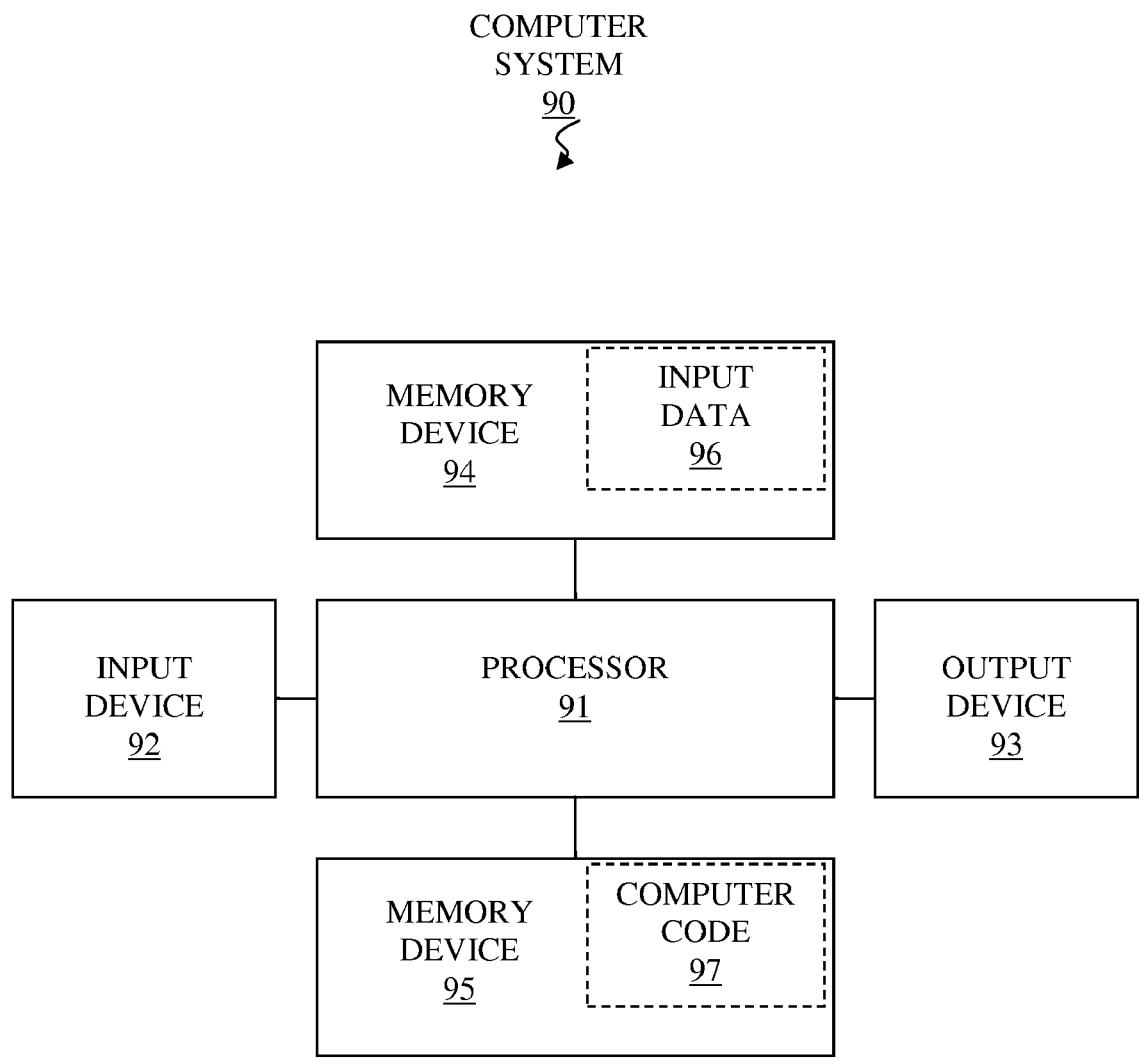
FIG. 4 illustrates a computer system used for utilizing generational file names, in accordance with embodiments of the present invention.

FIG. 4 illustrates a computer system 90 used for utilizing generational file names, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for utilizing generational file names according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for utilizing file names of diagnostic data files that are automatically generated by a runtime environment operatively coupled to a file system, the method comprising:
initializing a generation number (Z) corresponding to a current instance of the runtime environment such that a number of the diagnostic data files in the file system for all instances of the runtime environment does not exceed a predetermined maximum number of the diagnostic data files permitted in the file system and such that the file system keeps an old diagnostic data file that had been generated by a previous instance of the runtime environment while operating the current instance of the runtime environment, wherein said initializing is performed at startup of each instance of the runtime environment, wherein a file counter base (X) defines the predetermined maximum number of the diagnostic data files permitted in the file system, wherein each diagnostic data file of said diagnostic data files is uniquely identified by a respective file name (N) that comprises a respective file counter (F), and wherein said each diagnostic data file stores information selected from the group consisting of memory dumps of a physical platform in which the runtime environment operates, traces of the physical platform, heap statistics of the physical platform, a respective process identifier of a process in the physical platform that creates said each diagnostic data file, a respective timestamp when said each diagnostic data file is created, and combinations thereof;
setting a file counter (F) for the current instance of the runtime environment to the initialized generation number (Z) such that the file counter (F) differentiates the diagnostic data files generated by the current instance of the runtime environment from the old diagnostic data file generated by the previous instance of the runtime environment;
storing a diagnostic data file generated by the current instance of the runtime environment in the file system by a file name (N) comprising the file counter (F) from said setting; and
subsequent to said storing, recalculating a new value of the file counter (F) from a current value of the file counter (F) by assigning a value resulting from a mathematical modulo operation on the current value of the file counter (F) incremented by one (1) and the file counter base (X), that is ((F+1) MOD X), to the new value of the file counter (F) such that another diagnostic data file generated by the current instance of the runtime environment is identified by another file name distinctive from the file name (N).

2. The method of claim 1, said initializing comprising:
locating, in the file system, a smallest value of the file counter (F) that is not used in all file names for existing diagnostic data files in the file system;
determining that the smallest value of the file counter (F) from said locating is less than the file counter base (X); and responsive to said determining, assigning the smallest value of the file counter (F) from said locating to the generation number (Z) for the current instance of the runtime environment.

3. The method of claim 1, said initializing comprising:
locating, in the file system, a smallest value of the file counter (F) that is not used in all file names for existing diagnostic data files in the file system;
subsequent to said locating, determining that the smallest value of the file counter (F) from said locating is equal to the file counter base (X); and
responsive to said determining, assigning zero (0) to the generation number (Z) for the current instance of the runtime environment.

4. The method of claim 1, wherein the file name (N) further comprises a file name pattern (Y) that configures a format for the file name (N) by use of the generation number (Z) corresponding to the current instance of the runtime environment.

5. The method of claim 1, wherein the file name (N) further comprises a member of the group consisting of a process identifier, a timestamp, and a combination thereof, wherein the process identifier corresponds to a process that generates the diagnostic data file associated with the file name (N) within the current instance of the runtime environment, and the timestamp represents a point of time when the process generates the diagnostic data file.

6. A computer program product, comprising a computer usable storage medium having a computer readable program code embodied therein, said computer readable program code containing instructions that when executed by a processor of a computer system implement a method for utilizing file names of diagnostic data files that are automatically generated by a runtime environment operatively coupled to a file system, the method comprising:
initializing a generation number (Z) corresponding to a current instance of the runtime environment such that a number of the diagnostic data files in the file system for all instances of the runtime environment does not exceed a predetermined maximum number of the diagnostic data files permitted in the file system and such that the file system keeps an old diagnostic data file that had been generated by a previous instance of the runtime environment while operating the current instance of the runtime environment, wherein said initializing is performed at startup of each instance of the runtime environment, wherein a file counter base (X) defines the predetermined maximum number of the diagnostic data files permitted in the file system, wherein each diagnostic data file of said diagnostic data files is uniquely identified by a respective file name (N) that comprises a respective file counter (F), and wherein said each diagnostic data file stores information selected from the group consisting of memory dumps of a physical platform in which the runtime environment operates, traces of the physical platform, heap statistics of the physical platform, a respective process identifier of a process in the physical platform that creates said each diagnostic data file, a respective timestamp when said each diagnostic data file is created, and combinations thereof;
setting a file counter (F) for the current instance of the runtime environment to the initialized generation number (Z) such that the file counter (F) differentiates the diagnostic data files generated by the current instance of the runtime environment from the old diagnostic data file generated by the previous instance of the runtime environment;
storing a diagnostic data file generated by the current instance of the runtime environment in the file system by a file name (N) comprising the file counter (F) from said setting; and
subsequent to said storing, recalculating a new value of the file counter (F) from a current value of the file counter (F) by assigning a value resulting from a mathematical modulo operation on the current value of the file counter (F) incremented by one (1) and the file counter base (X), that is ((F+1) MOD X), to the new value of the file counter (F) such that another diagnostic data file generated by the current instance of the runtime environment is identified by another file name distinctive from the file name (N).

7. The computer program product of claim 6, said initializing comprising:
locating, in the file system, a smallest value of the file counter (F) that is not used in all file names for existing diagnostic data files in the file system;
determining that the smallest value of the file counter (F) from said locating is less than the file counter base (X); and
responsive to said determining, assigning the smallest value of the file counter (F) from said locating to the generation number (Z) for the current instance of the runtime environment.

8. The computer program product of claim 6, said initializing comprising:
locating, in the file system, a smallest value of the file counter (F) that is not used in all file names for existing diagnostic data files in the file system;
subsequent to said locating, determining that the smallest value of the file counter (F) from said locating is equal to the file counter base (X); and
responsive to said determining, assigning zero (0) to the generation number (Z) for the current instance of the runtime environment.

9. The computer program product of claim 6, wherein the file name (N) further comprises a file name pattern (Y) that configures a format for the file name (N) by use of the generation number (Z) corresponding to the current instance of the runtime environment.

10. The computer program product of claim 6, wherein the file name (N) further comprises a member of the group consisting of a process identifier, and a timestamp, and a combination thereof, wherein the process identifier corresponds to a process that generates the diagnostic data file associated with the file name (N) within the current instance of the runtime environment, and the timestamp represents a point of time when the process generates the diagnostic data file.

11. A computer system comprising a processor and a computer readable memory unit coupled to the processor, said memory unit containing instructions that when executed by the processor implement a method for utilizing file names of diagnostic data files that are automatically generated by a runtime environment operatively coupled to a file system, the method comprising:
initializing a generation number (Z) corresponding to a current instance of the runtime environment such that a number of the diagnostic data files in the file system for all instances of the runtime environment does not exceed a predetermined maximum number of the diagnostic data files permitted in the file system and such that the file system keeps an old diagnostic data file that had been generated by a previous instance of the runtime environment while operating the current instance of the runtime environment, wherein said initializing is performed at startup of each instance of the runtime environment, wherein a file counter base (X) defines the predetermined maximum number of the diagnostic data files permitted in the file system, wherein each diagnostic data file of said diagnostic data files is uniquely identified by a respective file name (N) that comprises a respective file counter (F), and wherein said each diagnostic data file stores information selected from the group consisting of memory dumps of a physical platform in which the runtime environment operates, traces of the physical platform, heap statistics of the physical platform, a respective process identifier of a process in the physical platform that creates said each diagnostic data file, a respective timestamp when said each diagnostic data file is created, and combinations thereof;

setting a file counter (F) for the current instance of the runtime environment to the initialized generation number (Z) such that the file counter (F) differentiates the diagnostic data files generated by the current instance of the runtime environment from the old diagnostic data file generated by the previous instance of the runtime environment;

storing a diagnostic data file generated by the current instance of the runtime environment in the file system by a file name (N) comprising the file counter (F) from said setting; and subsequent to said storing, recalculating a new value of the file counter (F) from a current value of the file counter (F) by assigning a value resulting from a mathematical modulo operation on the current value of the file counter (F) incremented by one (1) and the file counter base (X), that is ((F+1) MOD X), to the new value of the file counter (F) such that another diagnostic data file generated by the current instance of the runtime environment is identified by another file name distinctive from the file name (N).

12. The computer system of claim 11, said initializing comprising:
locating, in the file system, a smallest value of the file counter (F) that is not used in all file names for existing diagnostic data files in the file system;
determining that the smallest value of the file counter (F) from said locating is less than the file counter base (X); and
responsive to said determining, assigning the smallest value of the file counter (F) from said locating to the generation number (Z) for the current instance of the runtime environment.

13. The computer system of claim 11, said initializing comprising:
locating, in the file system, a smallest value of the file counter (F) that is not used in all file names for existing diagnostic data files in the file system;
subsequent to said locating, determining that the smallest value of the file counter (F) from said locating is equal to the file counter base (X); and
responsive to said determining, assigning zero (0) to the generation number (Z) for the current instance of the runtime environment.

14. The computer system of claim 11, wherein the file name (N) further comprises a file name pattern (Y) that configures a format for the file name (N) by use of the generation number (Z) corresponding to the current instance of the runtime environment, and wherein the file name further comprises a member of the group consisting of a process identifier, a timestamp, and a combination thereof, wherein the process identifier corresponds to a process that generates the diagnostic data file associated with the file name (N) within the current instance of the runtime environment, and the timestamp represents a point of time when the process generates the diagnostic data file.

* * * * *